United States Patent
Hiramoto et al.

(10) Patent No.: US 8,779,761 B2
(45) Date of Patent: Jul. 15, 2014

(54) ROTATION ANGLE DETECTING UNIT

(75) Inventors: Satoru Hiramoto, Chita (JP); Yoshiyuki Kono, Obu (JP); Akitoshi Mizutani, Okazaki (JP); Koichiro Matsumoto, Kyoto (JP)

(73) Assignee: Denso Corporation, Kariya (JP)

( * ) Notice: Subject to any disclaimer, the term of this patent is extended or adjusted under 35 U.S.C. 154(b) by 372 days.

(21) Appl. No.: 13/223,532

(22) Filed: Sep. 1, 2011

(65) Prior Publication Data
US 2012/0062218 A1 Mar. 15, 2012

(30) Foreign Application Priority Data

Sep. 15, 2010 (JP) ................ 2010-206654

(51) Int. Cl.
*G01B 7/30* (2006.01)
(52) U.S. Cl.
USPC ............ 324/207.25; 324/207.22; 324/207.23; 324/200; 324/245; 324/167; 702/145; 702/147; 702/151; 702/163; 73/862.331; 73/117.02
(58) Field of Classification Search
USPC ............ 324/207.25, 207.22, 207.23, 207.11, 324/200, 245, 167; 702/145, 147, 151, 163; 73/862.331, 862.326, 117.02
See application file for complete search history.

(56) References Cited

U.S. PATENT DOCUMENTS

| | | | |
|---|---|---|---|
| 6,407,543 B1 | 6/2002 | Hagio et al. | |
| 6,448,762 B1* | 9/2002 | Kono et al. | 324/207.2 |
| 6,844,719 B2* | 1/2005 | Tsuge et al. | 324/174 |
| 7,982,455 B2* | 7/2011 | Ito et al. | 324/207.25 |
| 8,141,423 B2* | 3/2012 | Takayama | 73/488 |
| 2003/0001566 A1* | 1/2003 | Tsuge et al. | 324/207.25 |
| 2003/0080732 A1 | 5/2003 | Okazaki et al. | |

(Continued)

FOREIGN PATENT DOCUMENTS

| | | |
|---|---|---|
| JP | 7-181192 | 7/1995 |
| JP | P2004-233280 A | 8/2004 |

OTHER PUBLICATIONS

Japanese Office Action dated Jul. 3, 2012, issued in corresponding Japanese Application No. 2010-206654 with English translation.

(Continued)

*Primary Examiner* — Tung X Nguyen
*Assistant Examiner* — Thang Le
(74) *Attorney, Agent, or Firm* — Nixon & Vanderhye PC

(57) ABSTRACT

A rotation angle detecting unit includes an IC package having a magnetism detecting element, a sealing body, and leads; and a covering member having a fixing part and a supporting part, which are integrally formed from resin. The element outputs a signal according to change of a magnetic field generated upon rotation of a magnetism generating device attached to a detection object. The sealing body covers the element. The leads are connected to the element, and project from the sealing body. The fixing part is fixed to a supporting body so that the covering member is attached to the supporting body. The supporting part supports the package such that the element can output the signal. The package is press-fitted into the supporting part after its formation, so that the package is supported by the supporting part with a predetermined pressure applied to part of an outer wall of the sealing body.

3 Claims, 4 Drawing Sheets

(56) References Cited

U.S. PATENT DOCUMENTS

| | | | |
|---|---|---|---|
| 2004/0080314 A1* | 4/2004 | Tsujii et al. | 324/207.21 |
| 2005/0007098 A1* | 1/2005 | Harada | 324/174 |
| 2006/0119353 A1* | 6/2006 | Nakano et al. | 324/207.25 |
| 2007/0075705 A1* | 4/2007 | Kurumado | 324/207.25 |
| 2007/0247143 A1* | 10/2007 | Ikeda et al. | 324/207.25 |

OTHER PUBLICATIONS

Office Action (6 pages) dated Nov. 6, 2013, issued in corresponding Chinese Application No. 201110287297.0 and English translation (5 pages).

* cited by examiner

ROTATION ANGLE DETECTING UNIT

CROSS REFERENCE TO RELATED APPLICATION

This application is based on and incorporates herein by reference Japanese Patent Application No. 2010-206654 filed on Sep. 15, 2010.

BACKGROUND OF THE INVENTION

1. Field of the Invention

The present invention relates to a rotation angle detecting unit that detects a rotation angle of a detection object.

2. Description of Related Art

A rotation angle detecting unit obtained as a result of molding an integrated circuit (IC) package, which includes a magnetism detecting element, in a covering member made of resin, is conventionally known (see, e.g., JP-A-2004-004114 corresponding to U.S. Pat. No. 6,407,543B1). The covering member is attached to a supporting body that rotatably supports a detection object. In this rotation angle detecting unit, the covering member and the IC package are integrally formed (resin-molded), so that a position of the magnetism detecting element is stabilized, and accuracy in detection of a rotation angle of the detection object is improved. However, when thermal stress is applied to the IC package due to a difference in linear expansion between the IC package and the resin of the covering member, there is a possibility that temperature characteristics of output of the magnetism detecting element may deteriorate. Moreover, when the IC package is molded in the covering member (at the time of production of the detecting unit), forming stress is applied to the IC package and the magnetism detecting element. For this reason, it is necessary to examine after the production whether the magnetism detecting element is damaged. As a result of this, costs for the examination will increase.

In a rotation angle detecting unit described in JP-A-H07-181192, an IC package is covered with an elastic body, and the IC package and the elastic body are molded in a covering member made of resin. Thus, in addition to the above-described problems, there is a problem that material costs and processing costs for the covering of the IC package with the elastic body will increase.

SUMMARY OF THE INVENTION

The present invention addresses at least one of the above disadvantages.

According to the present invention, there is provided a rotation angle detecting unit attached to a supporting body for detecting a rotation angle of a detection object that is rotatably held by the supporting body. The rotation angle detecting unit includes an integrated circuit (IC) package and a covering member. The IC package includes a magnetism detecting element, a sealing body, and a plurality of leads. The magnetism detecting element is configured to output a signal, which is in accordance with a change of a magnetic field generated upon rotation of a magnetism generating means attached to the detection object. The sealing body covers the magnetism detecting element. The plurality of leads is connected to the magnetism detecting element, and projects from the sealing body. The covering member is attached to the supporting body, and includes a fixing part and a supporting part. The fixing part is fixed to the supporting body so that the covering member is attached to the supporting body. The supporting part supports the IC package such that the magnetism detecting element is enabled to output the signal. The fixing part and the supporting part are integrally formed from resin. The IC package is press-fitted into the supporting part after its formation, so that the IC package is supported by the supporting part with a predetermined pressure applied to a part of an outer wall of the sealing body.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the invention will be described below in reference to the accompanying drawings. A rotation angle detecting unit according to the embodiment of the invention will be described in FIGS. 1 to 3B.

The rotation angle detecting unit 1 of the present embodiment is used for calculating a degree of opening of a throttle valve 11 disposed in a vehicle. The rotation angle detecting unit 1 detects a rotation angle of a valve stem 12 of the throttle valve 11 as a detection object.

Figure 1:
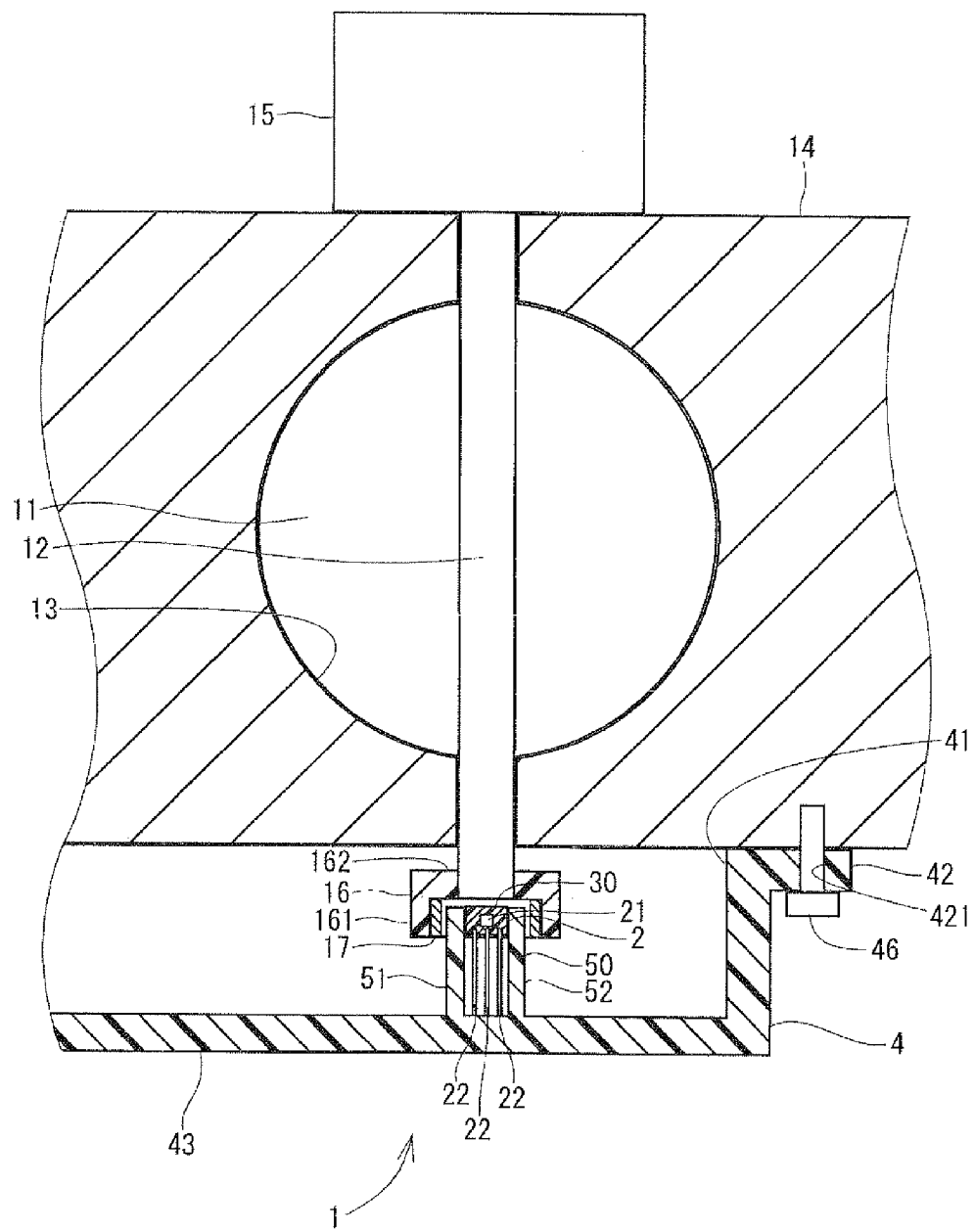
FIG. 1 is a sectional view of a main feature of a rotation angle detecting unit in accordance with an embodiment of the invention, illustrating a state of attachment of the rotation angle detecting unit to a supporting body that supports a detection object.

First, the throttle valve 11 will be described. As illustrated in FIG. 1, the throttle valve 11 is formed in the shape of a generally circular disk, and disposed in an intake passage 13. The valve stem 12 is formed integrally with the throttle valve 11 to pass through the center of the throttle valve 11 in a direction of a plate surface of the valve 11. Portions of the valve stem 12 on both side of the throttle valve 11 are shaft-borne by a throttle body 14 that define the intake passage 13. The throttle body 14 may correspond to a "supporting body". The intake passage 13 is formed to extend in a direction perpendicular to a plane of paper of FIG. 1. The valve stem 12 is disposed to be generally perpendicular to a flow direction of intake air. Both ends of the valve stem 12 project from the throttle body 14.

As a result of the valve stem 12 being shaft-borne by the throttle body 14, the throttle valve 11 is rotatable together with the valve stem 12 in the intake passage 13. In other words, the throttle body 14 rotatably supports the throttle valve 11, which is the detection object. Accordingly, the throttle valve 11 can open or close the intake passage 13 by its rotation.

A motor 15 is attached to one end portion of the valve stem 12. The motor 15 is controlled by an electronic control unit (not shown: hereinafter referred to as an "ECU"), thereby to rotate the valve stem 12. The ECU controls the opening degree of the throttle valve 11 by controlling rotation of the motor 15, so as to adjust the amount of intake air supplied to an internal combustion engine (not shown).

A holder 16 is attached to the other end portion of the valve stem 12. The holder 16 includes a cylindrical part 161, and a bottom part 162 that closes one end portion of the cylindrical part 161. In other words, the holder 16 has a cylindrical shape with a bottom. The center of the bottom part 162 is fixed to the valve stem 12, so that the holder 16 is attached to the valve stem 12. A magnet (magnetism generating means) 17 is attached on an inner wall of the cylindrical part 161 of the holder 16. The magnet 17 is, for example, a bonded magnet, and disposed such that polarities of its north pole and south pole are arranged alternately in a circumferential direction of the cylindrical part 161. Consequently, upon rotation of the valve stem 12, a magnetic field changes radially inward of the cylindrical part 161.

Next, the rotation angle detecting unit 1 will be described. As illustrated in FIG. 1, the rotation angle detecting unit 1 is attached to the throttle body 14 to cover the end portion of the valve stem 12 on the holder 16-side. The rotation angle detecting unit 1 includes an IC package 2 and a covering member 4.

The IC package 2 includes a magnetism detecting element 21, a sealing body 30, and leads 22. The magnetism detecting element 21 is a magnetometric sensor, such as a Hall element or a magnetoresistive (MR) element. The magnetism detecting element 21 can output a signal in accordance with a change of a magnetic field around the element 21.

The sealing body 30 is formed from resin, and disposed to cover the entire magnetism detecting element 21. The sealing body 30 serves to protect the magnetism detecting element 21 from an impact from the outside, heat humidity, and so forth.

The leads 22 are formed from metal, and connected to the magnetism detecting element 21. A portion of the lead 22 except its end portion connected to the magnetism detecting element 21 projects (is exposed) from the sealing body 30. In the present embodiment, three leads 22 are provided for one IC package 2.

Figure 2A:
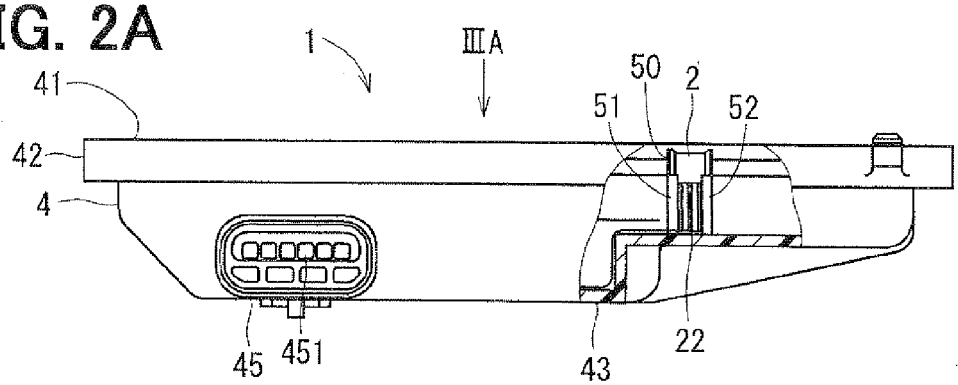
FIG. 2A is a front view illustrating the rotation angle detecting unit of the embodiment, with a part of the detecting unit being notched.
Figure 3A:
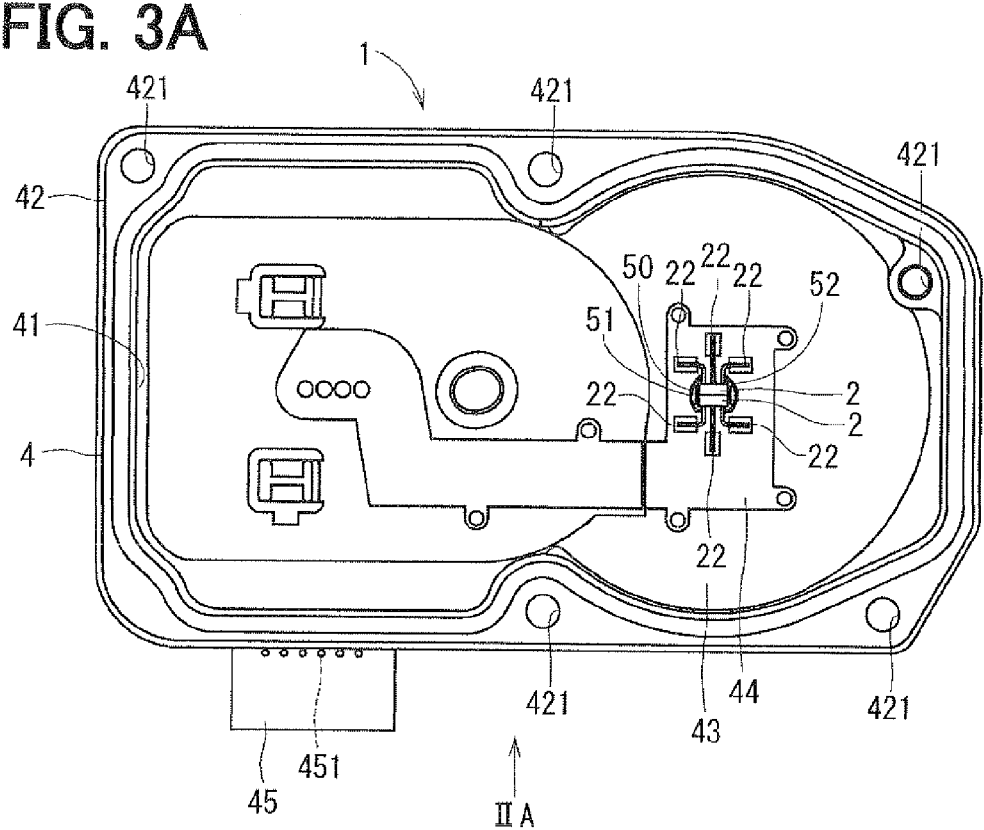
FIG. 3A is a diagram illustrating the rotation angle detecting unit in accordance with the embodiment and viewed from a direction of an arrow IIIA in FIG. 2A.

The covering member 4 is formed in the shape of a shallow box with a bottom as illustrated in FIGS. 2A and 3A. The covering member 4 is formed from resin. The covering member 4 includes a flanged portion 42 extending annularly outward from its opening 41 (see FIGS. 1, 2A and 3A). Holes 421 are formed in the flanged portion 42 (see FIG. 3A).

A supporting part 50 is formed on a bottom part 43 of the covering member 4. The supporting part 50 is formed to extend from the bottom part 43 in a direction perpendicular to a wall surface of the bottom part 43. As described above, in the present embodiment, the covering member 4 is configured as a result of all of the flanged portion 42, the bottom part 43, and the supporting part 50 being integrally formed from resin. The IC package 2 is press-fitted into a front end portion of the supporting part 50 after its formation (end portion of the supporting part 50 on the opposite side from the bottom part 43), so that the IC package 2 is supported by the supporting part 50 with a predetermined pressure applied to a part of an outer wall of the sealing body 30 (see FIGS. 1, 2A, 2B, 3A, and 3B). In the present embodiment, the two IC packages 2 are provided (see FIGS. 3A and 3B).

Figure 3B:
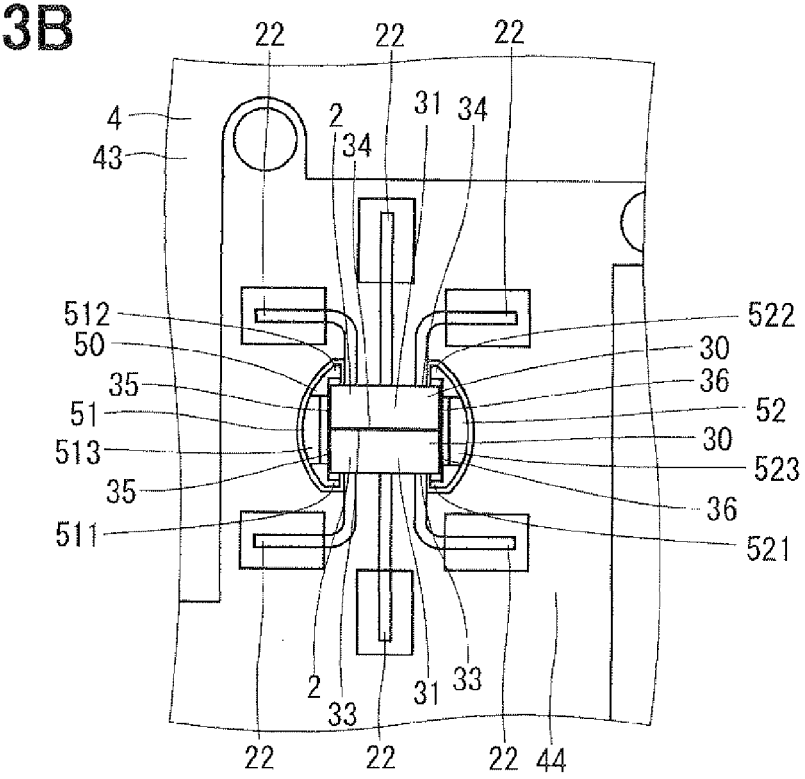
FIG. 3B is an enlarged view illustrating vicinity of the supporting part of the rotation angle detecting unit in FIG. 3A.

As illustrated in FIGS. 3A and 3B, an end portion of the lead 22 of the IC package 2 on the opposite side from the sealing body 30 is soldered onto a substrate 44 provided on the bottom part 43. As illustrated in FIGS. 2A and 3A, a connector part 45 is formed between the bottom part 43 and the flanged portion 42 of the covering member 4. Terminals 451 are provided inside the connector part 45. The terminals 451 and the leads 22 of the IC package 2 are connected together by a printed wiring (not shown) provided on the substrate 44. A wire harness (not shown) is connected to the connector part 45. A conductive wire of the wire harness connects the terminal 451, the ECU, and a power source (not shown). As a result, the magnetism detecting element 21, the ECU, and the power source are connected together through the lead 22, the printed wiring of the substrate 44, the terminal 451 and the conductive wire of the wire harness. In the present embodiment, the three leads 22 for the one IC package 2 are connected respectively to the ECU, a positive side of the power source, and a negative side of the power source.

The flanged portion 42 is screwed and fixed to the throttle body 14 by passing a fastening member such as a screw 46 through the hole 421 (see FIG. 1).

In consequence, the covering member 4 is attached to the throttle body 14. The flanged portion 42 may correspond to a "fixing part".

As illustrated in FIG. 1, the covering member 4 is attached to the throttle body 14 to cover the end portion of the valve stem 12 on the holder 16-side. The front end portion of the supporting part 50 is opposed to the valve stem 12, and located radially inward of the cylindrical part 161 of the holder 16.

As a result of the above-described configuration of the detecting unit 1, with the covering member 4 attached to the throttle body 14, the IC package 2 is located radially inward of the cylindrical part 161 of the holder 16 (inward of the magnet 17). In this state, when the valve stem 12 is rotated by the motor 15 and the holder 16 rotates together with the throttle valve 11, the magnetic field around the IC package 2 changes. The magnetism detecting element 21 of the IC package 2 outputs a signal, which is in accordance with the change of magnetic field around the element 21. Therefore, the magnetism detecting element 21 outputs the signal that is in accordance with the change of the magnetic field made due to the rotation of the magnet 17 attached to the holder 16. A change of this signal over time corresponds to a temporal change of the rotation angle of the valve stem 12.

The signal outputted from the magnetism detecting element 21 is transmitted to the ECU via the above-described wire harness. The ECU detects the rotation angle of the valve stem 12 based on the transmitted signal. As a consequence, the ECU can calculate the opening degree of the throttle valve 11. In the present embodiment, there are the two IC packages 2 provided. Thus, even if one IC package 2 fails to operate properly, for example, detection of the rotation angle of the valve stem 12 can be continued by the other IC package 2. As described above, the supporting part 50 of the covering member 4 supports the two IC packages 2 so that the magnetism detecting element 21 can output the signal.

Figure 2B:
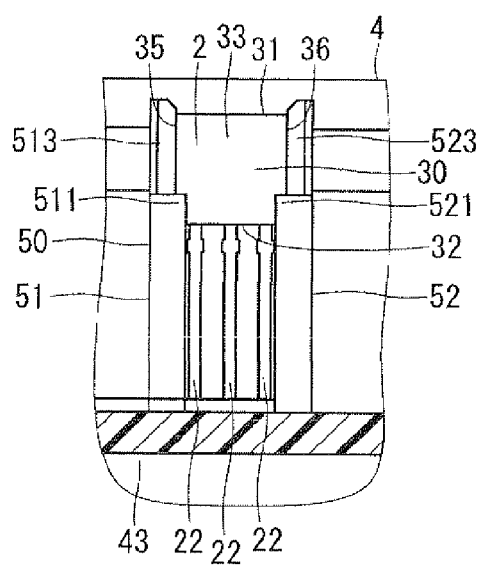
FIG. 2B is an enlarged view illustrating vicinity of a supporting part of the detecting unit in FIG. 2A.

A manner of the supporting of the IC package 2 by the supporting part 50 will be described in greater detail. In the present embodiment, the sealing body 30 of the IC package 2 is formed into the shape of an approximately rectangular solid as illustrated in FIG. 2D. Accordingly, the sealing body 30 includes an upper surface 31; a lower surface 32, which is a surface on the opposite side from the upper surface 31; a front surface 33, which is a surface between the upper surface 31 and the lower surface 32; a rear surface 34, which is a surface on the opposite side from the front surface 33; and a side surface 35 and a side surface 36, which are surfaces between the front surface 33 and the rear surface 34. The magnetism detecting element 21 is disposed to be located at the central portion of the sealing body 30, and such that a magnetism sensing surface 211 is generally parallel to the front surface 33. Respective parts of the leads 22 except its end portion connected to the magnetism detecting element 21 project (are exposed) from the lower surface 32.

Figure 2C:
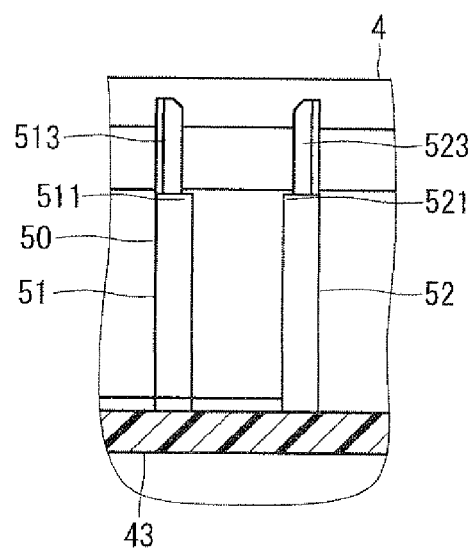
FIG. 2C is a diagram illustrating only the supporting part in FIG. 2B.
Figure 2D:
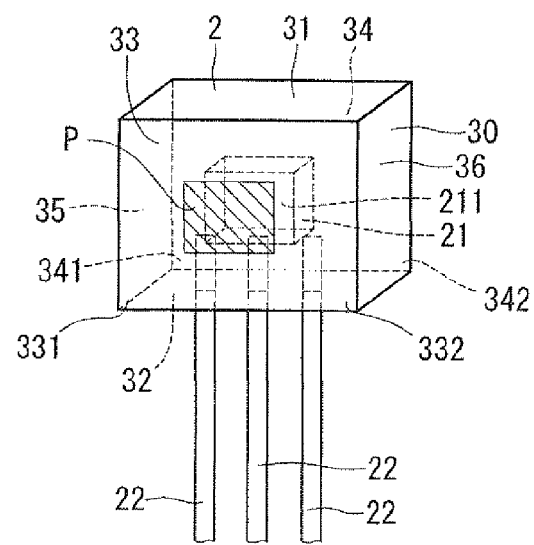
FIG. 2D is a schematic perspective view illustrating an IC package in the rotation angle detecting unit in accordance with the embodiment.

In the present embodiment, the supporting part 50 is made up of a first supporting part 51 and a second supporting part 52 (see FIG. 2C). The first supporting part 51 includes a front surface supporting part 511, a rear surface supporting part 512 and a side surface supporting part 513. The second supporting part 52 includes a front surface supporting part 521, a rear surface supporting part 522 and a side surface supporting part 523 (see FIGS. 2B, 2C and 3B).

As illustrated in FIG. 3B, the two IC packages 2 are press-fitted into the front end portion of the supporting part 50 (end portion of the supporting part 50 on the opposite side from the bottom part 43), with their sealing bodies 30 overlapping with each other as a result of the contact of the rear surface 34 of one IC package 2 and the front surface 33 of the other IC package 2.

The front surface supporting part 511 of the first supporting part 51 is in contact with a corner part 331 of the front surface 33 of one IC package 2 that is close to both the lower surface 32 and the side surface 35 (see FIGS. 2B, 2D, and 3B). The rear surface supporting part 512 of the first supporting part 51 is in contact with a corner part 341 of the rear surface 34 of the other IC package 2 that is close to both the lower surface 32 and the side surface 35 (see FIGS. 2D and 3B).

The front surface supporting part 521 of the second supporting part 52 is in contact with a corner part 332 of the front surface 33 of one IC package 2 that is close to both the lower surface 32 and the side surface 36 (see FIGS. 2B, 2D, and 3B). The rear surface supporting part 522 of the second supporting part 52 is in contact with a corner part 342 of the rear surface 34 of the other IC package 2 that is close to both the lower surface 32 and the side surface 36 (see FIGS. 2D and 3B).

A distance between the front surface supporting part 511 and the rear surface supporting part 512 of the first supporting part 51; and a distance between the front surface supporting part 521 and the rear surface supporting part 522 of the second supporting part 52 are set to be slightly smaller than thickness of the two IC packages 2 at the time of stacking of the two IC packages 2 (distance between the front surface 33 of one IC package 2 and the rear surface 34 of the other IC package 2). Hence, the two IC packages 2 are supported by the supporting part 50 with a predetermined pressure applied to the corner parts 331, 341, 332, 342, such that the two IC packages 2 are sandwiched respectively between the front surface supporting part 511 and the front surface supporting part 521; and the rear surface supporting part 512 and the rear surface supporting part 522. The distance between the front surface supporting part 511 and the rear surface supporting part 512 is set, such that the predetermined pressure becomes a pressure that is equal to or higher than such a pressure as to hold the two IC packages 2 and that is lower than such a pressure as to cause breakdown of the magnetism detecting element 21.

The side surface supporting part 513 of the first supporting part 51 is in contact with the side surfaces 35 of the two IC packages 2 (see FIGS. 2B, 2D, and 3B). The side surface supporting part 523 of the second supporting part 52 is in contact with the side surfaces 36 of the two IC packages 2 (see FIGS. 2B, 2D, and 3B).

A distance between the side surface supporting part 513 of the first supporting part 51 and the side surface supporting part 523 of the second supporting part 52 is set to be slightly smaller than a width of the IC package 2 (distance between the side surface 35 and the side surface 36). Accordingly, the two IC packages 2 are supported by the supporting part 50 such that the two IC packages 2 are sandwiched between the side surface supporting part 513 and the side surface supporting part 523, with a predetermined pressure acting on the side surface 35 and the side surface 36. The distance between the side surface 35 and the side surface 36 is set such that the predetermined pressure becomes the pressure that is equal to or higher than such a pressure as to hold the two IC packages 2 and that is lower than such a pressure as to cause breakdown of the magnetism detecting element 21.

The corner parts 331, 341, 332, 342, the side surface 35, and the side surface 36 of the outer wall of the sealing body 30 are the portions different from a portion P (portion hatched in FIG. 2D) of the outer wall of the sealing body 30 that corresponds to the magnetism sensing surface 211 of the magnetism detecting element 21. In other words, the supporting part 50 supports the IC package 2 to sandwich a region of the outer wall of the sealing body 30 except its portion P that corresponds to (overlaps with) the magnetism sensing surface 211 of the magnetism detecting element 21.

In the present embodiment, as illustrated in FIGS. 2B and 3B, the front surface supporting part 511, the rear surface supporting part 512, and the side surface supporting part 513 of the first supporting part 51, and the front surface supporting part 521, the rear surface supporting part 522, and the side surface supporting part 523 of the second supporting part 52 have end portions on their opposite sides from the bottom part 43; and the corner parts of these end portions are chamfered. As a result, when the IC package 2 is press-fitted into the supporting part 50 to be inserted in the supporting part 50 from the opposite side of the supporting part 50 from the bottom part 43, the IC package 2 can easily be inserted into the supporting part 50.

As described above, in the present embodiment, the flanged portion 42 ("fixing part") and the supporting part 50 of the portions that constitute the covering member 4 are integrally formed from resin; and the flanged portion 42 is fixed to the throttle body 14, and the supporting part 50 supports the IC package 2. Consequently, when the covering member 4 is attached to the throttle body 14, a position of the supporting part 50 relative to the valve stem 12 of the throttle valve 11 is stabilized. Moreover, the IC package 2 is press-fitted into the supporting part 50 after its formation, so that the IC package 2 is supported by the supporting part 50 with a predetermined pressure applied to a part of the outer wall of the sealing body 30. As a result of this configuration of the detecting unit 1, the position of the IC package 2 relative to the supporting part 50 and the valve stem 12 is made stable.

As described above, in the present embodiment, the IC package 2 is press-fitted into the supporting part 50 after its formation, so that the IC package 2 is supported by the supporting part 50. In consequence, application of the "forming stress produced in the case of molding the IC package 2 in the covering member 4 made of resin" to the IC package 2 and the magnetism detecting element 21 can be avoided. Therefore, as a result of the rotation angle detecting unit 1 of the present embodiment, a process for examining whether the magnetism detecting element 21 is damaged after production of the detecting unit 1 can be eliminated. Thus, costs for the examination can be reduced.

Furthermore, the entire IC package 2 is not covered with resin (supporting part 50). Accordingly, influence of thermal stress upon the magnetism detecting element 21 by the linear expansion difference can be reduced. As a result, the temperature characteristics of the magnetism detecting element 21 can be stabilized.

In addition, the predetermined pressure is set at a pressure that is equal to or higher than such a pressure as to hold the IC packages 2 and that is lower than such a pressure as to cause breakdown of the magnetism detecting element 21. As a consequence, even though the IC package 2 is supported by the supporting part 50, destruction of the magnetism detecting element 21 is not caused.

As described above, in the present embodiment, the IC package 2 can be stably fixed to the covering member 4 without causing the damage to the magnetism detecting element 21. Because of the stable fixation of the IC package 2 to the covering member 4, the position of the magnetism detecting element 21 relative to the valve stem 12 of the throttle valve 11 is also made stable. In consequence, the signal that the magnetism detecting element 21 outputs in accordance with the change of the magnetic field at the time of rotation of the valve stem 12 is stabilized. Thus, accuracy in detection of the rotation angle of the valve stem 12 can be improved.

In the present embodiment, the sealing body 30 is formed generally in the shape of a rectangular parallelepiped, and includes the upper surface 31; the lower surface 32 which is on the opposite side of the sealing body 30 from the upper surface 31 and from which the lead 22 projects; the front surface 33 which is a surface between the upper surface 31 and the lower surface 32; the rear surface 34 which is the rear surface 34 on the opposite side of the sealing body 30 from the front surface 33; and the two side surfaces (side surfaces 35, 36) which are surfaces between the front surface 33 and the rear surface 34. The magnetism detecting element 21 is disposed to be located at the central portion of the sealing body 30, and such that a magnetism sensing surface 211 is generally parallel to the front surface 33. The IC package 2 is supported by the supporting part 50, with a predetermined pressure acting on the corner parts (corner parts 331, 341) of the front surface 33 and the rear surface 34 of the sealing body 30 that are close to both the lower surface 32 and the side surface 35, and on the corner parts (corner parts 332, 342) of the front surface 33 and the rear surface 34 that are close to both the lower surface 32 and the side surface 36; and with a predetermined pressure applied to the two side surfaces (side surfaces 35, 36).

The supporting part 50 supports the IC package 2 to sandwich the regions (corner parts 331, 341, 332, 342, and side surfaces 35, 36) of the outer wall of the sealing body 30 other than the portion P that corresponds to the magnetism sensing surface 211 of the magnetism detecting element 21. As a result of this configuration, when the IC package 2 is press-fitted and fixed in the supporting part 50, the application of stress to the magnetism sensing surface 211 of the magnetism detecting element 21 can be prevented. For this reason, the examination of the detecting unit 1 after the fixation of the IC package 2 can be simplified. Moreover, since application of the thermal stress by the supporting part 50 to the magnetism sensing surface 211 of the magnetism detecting element 21 is avoidable, deterioration of the temperature characteristics of the magnetism detecting element 21 can be prevented.

Additionally, since the supporting part 50 supports the IC package 2 to sandwich the regions of the front surface 33 and the rear surface 34 of the sealing body 30 near the portion from which the lead 22 projects, position misalignment of the IC package 2 in a direction perpendicular to the front surface 33 and the rear surface 34 can be limited. Furthermore, because the supporting part 50 supports the IC package 2 to sandwich both the side surfaces (side surfaces 35, 36) of the sealing body 30, position misalignment of the IC package 2 in a direction perpendicular to the side surfaces can also be limited. Therefore, deflection of the IC package 2 due to a vibration can be restrained, and destruction or fracture of the lead 22 of the IC package 2 can thereby be prevented.

Figure 4:
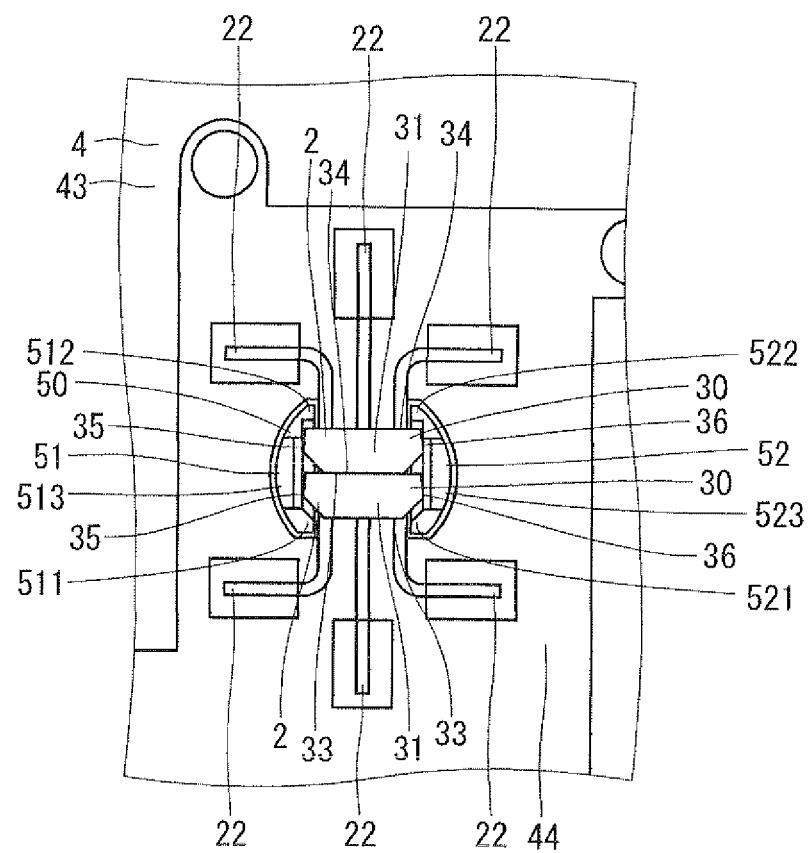
FIG. 4 is a diagram illustrating vicinity of a supporting part of a rotation angle detecting unit in accordance with a modification of the embodiment.

Modifications of the above embodiment will be described. In a modification of the embodiment of the invention, as illustrated in FIG. 4, a corner part between the front surface 33 and the side surface 35 of the sealing body 30, and a corner part between the front surface 33 and the side surface 36 of the sealing body 30 may be chamfered. In this modification, the front surface supporting part 511 and the front surface supporting part 521 are in contact with the chamfered portions of the sealing body 30.

In the above embodiment, the example of press-fitting of the two IC packages into the supporting part of the covering member with the two IC packages stacked up has been described. Alternatively, in a modification of the embodiment of the invention, only one IC package may be provided to be press-fitted in the supporting part.

In a modification of the embodiment of the invention, as long as the pressure that is equal to or higher than such a pressure as to hold the IC packages and that is lower than such a pressure as to cause breakdown of the magnetism detecting element is applied to the outer wall of the sealing body, the supporting part may support the IC package in contact with an area of the outer wall of the sealing body that includes the region corresponding to the magnetism sensing surface of the magnetism detecting element. Moreover, the supporting part may include only either one of "the front surface supporting part and the rear surface supporting part" and "the side surface supporting part".

In the above embodiment, the example of configuration of the supporting part being composed of the first supporting part and the second supporting part has been described. Alternatively, in a modification of the embodiment of the invention, the supporting part may be formed simply in one columnar shape, and the IC package may be press-fitted in its front end portion. Furthermore, the shape of the sealing body of the IC package is not limited to a rectangular parallelepiped, and the sealing body may be formed into any shape.

The rotation angle detecting unit of the invention may also be used, for example, for detecting a rotation angle of a rotation axis of an accelerator pedal, a crankshaft and so forth other than for the valve stem of the throttle valve. As above, the invention is not by any means limited to the above embodiment, and may be embodied in various modes without departing from the scope of the invention.

To sum up, the rotation angle detecting unit 1 of the above embodiment may be described as follows.

The rotation angle detecting unit 1 is attached to a supporting body 14 for detecting a rotation angle of a detection object 12 that is rotatably held by the supporting body 14. The rotation angle detecting unit 1 includes an integrated circuit (IC) package 2 and a covering member 4. The IC package 2 includes a magnetism detecting element 21, a sealing body 30, and a plurality of leads 22. The magnetism detecting element 21 is configured to output a signal, which is in accordance with a change of a magnetic field generated upon rotation of a magnetism generating means 17 attached to the detection object 12. The sealing body 30 covers the magnetism detecting element 21. The plurality of leads 22 is connected to the magnetism detecting element 21, and projects from the sealing body 30. The covering member 4 is attached to the supporting body 14, and includes a fixing part 42 and a supporting part 50. The fixing part 42 is fixed to the supporting body 14 so that the covering member 4 is attached to the supporting body 14. The supporting part 50 supports the IC package 2 such that the magnetism detecting element 21 is enabled to output the signal. The fixing part 42 and the supporting part 50 are integrally formed from resin. The IC package 2 is press-fitted into the supporting part 50 after its formation, so that the IC package 2 is supported by the supporting part 50 with a predetermined pressure applied to a part of an outer wall of the sealing body 30.

Accordingly, when the covering member 4 is attached to the supporting body 14, the position of the supporting part 50 relative to the detection object 12 is made stable. As a result of this configuration of the detecting unit 1, the position of the IC package 2 relative to the supporting part 50 and the detection object 12 is made stable.

As described above, in the invention, the IC package 2 is press-fitted into the supporting part 50 after its formation, so that the IC package 2 is supported by the supporting part 50. In consequence, application of the "forming stress produced in the case of molding the IC package 2 in the covering member 4 made of resin" to the IC package 2 and the magnetism detecting element 21 can be avoided. Accordingly, as a result of the rotation angle detecting unit 1 of the invention, the process for examining whether or not the magnetism detecting element 21 is damaged after production of the detecting unit 1 can be eliminated. Thus, costs for the examination of the detecting unit 1 can be reduced.

The whole area of the IC package 2 is not coated with resin (supporting part 50). Accordingly, influence of thermal stress on the magnetism detecting element 21 by the linear expansion difference can be reduced. As a result, the temperature characteristics of the magnetism detecting element 21 can be stabilized.

By setting the predetermined pressure at the pressure that is equal to or higher than such a pressure as to hold the IC packages 2 and that is lower than such a pressure as to cause breakdown of the magnetism detecting element 21, even though the IC package 2 is supported by the supporting part 50, destruction of the magnetism detecting element 21 is not caused. The "destruction of the magnetism detecting element 21" means that the magnetism detecting element 21 is put into a signal output disabled state, or a state of its output of a signal out of the normal range, for example.

As described above, in the invention, the IC package 2 can be stably fixed to the covering member 4 without causing the damage to the magnetism detecting element 21. Because of the stable fixation of the IC package 2 to the covering member 4, the position of the magnetism detecting element 21 relative to the detection object 12 is also made stable. In consequence, the signal that the magnetism detecting element 21 outputs in accordance with the change of the magnetic field at the time of rotation of the detection object 12 is stabilized. Thus, accuracy in detection of the rotation angle of the detection object 12 can be improved.

The supporting part 50 may support the IC package 2 so as to sandwich an area of the sealing body 30 except a region P of the outer wall of the sealing body 30 that corresponds to a magnetism sensing surface 211 of the magnetism detecting element 21. As a result of this configuration, when the IC package 2 is press-fitted and fixed in the supporting part 50, the application of stress to the magnetism sensing surface 211 of the magnetism detecting element 21 can be prevented. For this reason, the examination of the detecting unit 1 after the fixation of the IC package 2 can be simplified. Moreover, since application of the thermal stress by the supporting part 50 to the magnetism sensing surface 211 of the magnetism detecting element 21 is avoidable, deterioration of the temperature characteristics of the magnetism detecting element 21 can be prevented.

The sealing body 30 may be formed generally in a shape of a rectangular parallelepiped, and may include: an upper surface 31; a lower surface 32 which is located on an opposite side of the sealing body 30 from the upper surface 31 and from which the plurality of leads 22 project; a front surface 33 which is located between the upper surface 31 and the lower surface 32; a rear surface 34 which is located on an opposite side of the sealing body 30 from the front surface 33; and two side surfaces 35, 36 which are located between the front surface 33 and the rear surface 34. The magnetism detecting element 21 may be disposed so as to be located at a central portion of the sealing body 30 and such that the magnetism sensing surface 211 is generally parallel to the front surface 33. The IC package 2 may be supported by the supporting part 50 with a predetermined pressure applied to corner parts 331, 341, 332, 342 of the front surface 33 and the rear surface 34 that are close to both the lower surface 32 and the two side surfaces 35, 36. In other words, the supporting part 50 supports the IC package 2 to sandwich a region (corner part) of the outer wall of the sealing body 30 except its portion P that corresponds to the magnetism sensing surface 211 of the magnetism detecting element 21. As a result of this configuration, when the IC package 2 is press-fitted and fixed in the supporting part 50, the application of stress to the magnetism sensing surface 211 of the magnetism detecting element 21 can be prevented. For this reason, the examination of the detecting unit 1 after the fixation of the IC package 2 can be simplified. Moreover, since application of the thermal stress by the supporting part 50 to the magnetism sensing surface 211 of the magnetism detecting element 21 is avoidable, deterioration of the temperature characteristics of the magnetism detecting element 21 can be prevented.

Additionally, since the supporting part 50 supports the IC package 2 to sandwich the regions of the front surface 33 and the rear surface 34 of the sealing body 30 near the portion from which the lead 22 projects, position misalignment of the IC package 2 in a direction perpendicular to the front surface 33 and the rear surface 34 can be limited. Therefore, deflection of the IC package 2 due to a vibration can be restrained, and destruction or fracture of the lead 22 of the IC package 2 can thereby be prevented.

The sealing body 30 may be formed generally in a shape of a rectangular parallelepiped, and may include: an upper surface 31; a lower surface 32 which is located on an opposite side of the sealing body 30 from the upper surface 31 and from which the plurality of leads 22 project; a front surface 33 which is located between the upper surface 31 and the lower surface 32; a rear surface 34 which is located on an opposite side of the sealing body 30 from the front surface 33; and two side surfaces 35, 36 which are located between the front surface 33 and the rear surface 34. The magnetism detecting element 21 may be disposed so as to be located at a central portion of the sealing body 30 and such that the magnetism sensing surface 211 is generally parallel to the front surface 33. The IC package 2 may be supported by the supporting part 50 with a predetermined pressure applied to the two side surfaces 35, 36. In other words, the supporting part 50 supports the IC package 2 to sandwich a region (side surface) of the outer wall of the sealing body 30 except its portion P that corresponds to the magnetism sensing surface 211 of the magnetism detecting element 21. As a result of this configuration, when the IC package 2 is press-fitted and fixed in the supporting part 50, the application of stress to the magnetism sensing surface 211 of the magnetism detecting element 21 can be prevented. For this reason, the examination of the detecting unit 1 after the fixation of the IC package 2 can be simplified. Moreover, since application of the thermal stress by the supporting part 50 to the magnetism sensing surface 211 of the magnetism detecting element 21 is avoidable, deterioration of the temperature characteristics of the magnetism detecting element 21 can be prevented.

Furthermore, because the supporting part 50 supports the IC package 2 to sandwich both the side surfaces 35, 36 of the sealing body 30, position misalignment of the IC package 2 in a direction perpendicular to the side surfaces 35, 36 can also be limited. Therefore, deflection of the IC package 2 due to a vibration can be restrained, and destruction or fracture of the lead 22 of the IC package 2 can thereby be prevented.

Additional advantages and modifications will readily occur to those skilled in the art. The invention in its broader terms is therefore not limited to the specific details, representative apparatus, and illustrative examples shown and described.

What is claimed is:

1. A rotation angle detecting unit attached to a supporting body for detecting a rotation angle of a detection object that is rotatably held by the supporting body, comprising:
   an integrated circuit (IC) package that includes:
      a magnetism detecting element configured to output a signal, which is in accordance with a change of a magnetic field generated upon rotation of a magnetism generating means attached to the detection object;
      a sealing body covering the magnetism detecting element; and
      a plurality of leads connected to the magnetism detecting element and projecting from the sealing body; and
   a covering member that is attached to the supporting body and includes:
      a fixing part fixed to the supporting body so that the covering member is attached to the supporting body; and
      a supporting part supporting the IC package such that the magnetism detecting element is enabled to output the signal, wherein:
   the fixing part and the supporting part are integrally formed from resin;
   the IC package is press-fitted into the supporting part after its formation, so that the IC package is supported by the supporting part with contact applied to a part of an outer wall of the sealing body;
   the sealing body is formed generally in a shape of a rectangular parallelepiped, and includes:
      an upper surface;
      a lower surface which is located on an opposite side of the sealing body from the upper surface and from which the plurality of leads project;
      a front surface which is located between the upper surface and the lower surface;
      a rear surface which is located on an opposite side of the sealing body from the front surface; and
      two side surfaces which are located between the front surface and the rear surface;
   the magnetism detecting element is disposed so as to be located at a central portion of the sealing body and such that the magnetism sensing surface is generally parallel to the front surface; and
   the IC package is supported by the supporting part with contact applied to corner parts of the front surface and the rear surface that are close to both the lower surface and the two side surfaces.

2. The rotation angle detecting unit according to claim 1, wherein the supporting part supports the IC package so as to sandwich an area of the sealing body except a region of the outer wall of the sealing body that corresponds to a magnetism sensing surface of the magnetism detecting element.

3. The rotation angle detecting unit according to claim 1, wherein:
   the IC package is supported by the supporting part with contact applied to the two side surfaces.

* * * * *